(12) United States Patent
Takahashi et al.

(10) Patent No.: US 10,759,314 B2
(45) Date of Patent: Sep. 1, 2020

(54) VEHICLE SEAT

(71) Applicant: TOYOTA BOSHOKU KABUSHIKI KAISHA, Aichi-ken (JP)

(72) Inventors: Mayu Takahashi, Aichi-ken (JP); Tomoyuki Yamashita, Aichi-ken (JP); Atsushi Koizumi, Aichi-ken (JP); Keisuke Tagami, Gifu-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/199,734

(22) Filed: Nov. 26, 2018

(65) Prior Publication Data

US 2019/0160987 A1    May 30, 2019

(30) Foreign Application Priority Data

Nov. 27, 2017 (JP) ................. 2017-226872

(51) Int. Cl.
| | |
|---|---|
| *B60N 2/58* | (2006.01) |
| *B60N 2/64* | (2006.01) |
| *B60N 2/60* | (2006.01) |
| *B60N 2/75* | (2018.01) |
| *B60N 2/20* | (2006.01) |

(52) U.S. Cl.
CPC ......... *B60N 2/5825* (2013.01); *B60N 2/6009* (2013.01); *B60N 2/64* (2013.01); *B60N 2/20* (2013.01); *B60N 2/753* (2018.02); *B60N 2205/35* (2013.01)

(58) Field of Classification Search
CPC .. B60N 2/5825; B60N 2/6009; B60N 2/6036; B60N 2/64
See application file for complete search history.

(56) References Cited

U.S. PATENT DOCUMENTS

| | | | |
|---|---|---|---|
| 8,662,597 B2 | 3/2014 | Simoda | |
| 8,820,833 B2 * | 9/2014 | Tsuchiya ................. | B60N 2/682 |
| | | | 297/218.3 X |

FOREIGN PATENT DOCUMENTS

JP        2012-171501         9/2012

* cited by examiner

*Primary Examiner* — Anthony D Barfield
(74) *Attorney, Agent, or Firm* — Greenblum & Bernstein, P.L.C.

(57) ABSTRACT

A vehicle seat includes a seat pad; a backboard disposed on a back side of the seat pad; and a seat cover covering the seat pad and the backboard. The seat cover includes a pair of covering pieces adjacent to each other on the backboard-side, and a slide fastener that connects the covering pieces. When the slide fastener is closed with use of a slider, an end portion of the slide fastener is projected from an edge end of the seat cover in a state where the slider is disposed in the end portion of the slide fastener. The backboard is provided with an insertion portion. When the end portion of the closed slide fastener is disposed on a reverse side of the seat cover, the end portion of the slide fastener and the slider are inserted in and locked to the insertion portion.

10 Claims, 8 Drawing Sheets

VEHICLE SEAT

INCORPORATION BY REFERENCE

The disclosure of Japanese Patent Application No. 2017-226872 filed on Nov. 27, 2017 including the specification, drawings and abstract is incorporated herein by reference in its entirety.

BACKGROUND

1. Technical Field

The disclosure relates to a vehicle seat that includes a seat pad, a backboard, and a seat cover covering the seat pad and the backboard, the seat cover being provided with a slide fastener that connects adjacent covering pieces.

2. Description of Related Art

Japanese Patent Application Publication No. 2012-171501 (JP 2012-171501 A) describes an example of the vehicle seat. In the vehicle seat, a seat back serving as a backrest includes a cushion material that defines a seat outer shape; a covering material that covers the cushion material; and a fastener member. The cushion material is a member that corresponds to a seat pad in the disclosure and is made of a foamed resin. The cushion material has a substantially rectangular shape that is long in an up-down direction in a front view. The covering material is a member that corresponds to a seat cover in the disclosure, and is formed of a surface material such as fabric or leather. This covering material is formed by sewing a plurality of covering portions, each of which corresponds to a covering piece in the disclosure, such that the covering material has a bag shape. The covering material includes a covering portion that covers a seating side of the seat; a first covering portion that covers a rear surface of the seat; and a second covering portion that covers a lateral portion of the seat in a width direction. The fastener member is a band material that corresponds to a slide fastener in the disclosure and can connect the adjacent covering portions. The fastener member is provided between the first covering portion and the second covering portion that are adjacent to each other on the rear surface of the seat, and the fastener member extends in the up-down direction. An end portion of the fastener member is projected from lower portions of the covering portions.

The fastener member includes a pair of fastener pieces and a slider portion interposed between the fastener pieces. One of the fastener pieces is attached along an edge of the first covering portion. The other of the fastener pieces is attached along an edge of the second covering portion and disposed so as to face the one fastener piece. The slider portion is a member that is made of a metal plate and includes a handle. The slider portion allows the fastener pieces to mesh with each other such that the fastener pieces are connected to each other (i.e., the fastener member is closed). When the seat pad is covered with the seat cover, the slider portion is disposed at upper end portions of the fastener pieces to bring the fastener pieces into an unconnected state (i.e., to open the fastener member). In this way, a space can be formed between the first covering portion and the second covering portion. Thus, the seat pad can be smoothly covered with the seat cover. Furthermore, after the seat pad is covered with the seat cover, the slider portion is moved downward to connect both of the fastener pieces. When both of the fastener pieces are entirely connected, the slider portion is disposed at an end portion of the fastener member that is projected from the lower portions of the covering portions. Accordingly, in the related art, the end portion of the fastener member, in which the slider portion is disposed, is folded upward and inserted to be disposed on a reverse side of the first covering portion. Since the end portion of the fastener member and the slider portion are thus disposed between the first covering portion and the cushion material so as to be hidden (i.e., so as to be invisible), an appearance of the seat is improved.

SUMMARY

In the related art, in consideration of the appearance of the seat, the end portion of the fastener member and the slider portion are disposed on the reverse side of the first covering portion to be invisible. However, since the slider portion is made of the metal plate and thus is relatively hard, the presence of the slider portion is felt through the covering material. This may cause a feeling of a foreign body.

The disclosure makes it possible to dispose an end portion of a slide fastener on a reverse side of a seat cover such that a feeling of a foreign body is reduced as much as possible.

An aspect of the disclosure relates to a vehicle seat including a seat pad that defines a seat outer shape; a backboard having a plate shape, the backboard being disposed on a back side of the seat pad; and a seat cover that covers the seat pad and the backboard. The seat cover includes a pair of covering pieces adjacent to each other on the backboard-side, and a slide fastener that connects the pair of covering pieces. When the slide fastener is closed with use of a slider, an end portion of the slide fastener is projected from an edge end of the seat cover in a state where the slider is disposed in the end portion of the slide fastener. In the configuration, it is desirable that the end portion of the slide fastener should be disposed on a reverse side of the seat cover such that a feeling of a foreign body is reduced as much as possible.

Thus, in the above-described aspect of the disclosure, the backboard is provided with an insertion portion. When the end portion of the closed slide fastener is disposed on a reverse side of the seat cover, the end portion of the slide fastener and the slider are inserted in and locked to the insertion portion. In the above-described configuration, the end portion of the slide fastener and the slider are disposed on the reverse side of the seat cover, and are inserted in and locked to the insertion portion of the backboard. Thus, the backboard is disposed between the seat cover and the end portion (the slider) of the slide fastener. Thus, it is possible to avoid as much as possible the situation where the presence of the slider and so on is felt through the seat cover. That is, the end portion of the slide fastener can be disposed on the reverse side of the seat cover such that a feeling of a foreign body is reduced as much as possible.

In the above-described aspect, the insertion portion may include a projection. When the end portion of the slide fastener is inserted in the insertion portion, the end portion may be locked to the projection. The projection may be provided around an opening of the insertion portion and is projected toward the seat pad. In the above-described configuration, the end portion of the slide fastener can be further stably (i.e., reliably) locked to the projection provided around the opening of the insertion portion. That is, the end portion of the slide fastener can be further stably disposed on the reverse side of the seat cover.

In the above-described aspect, the projection may be a plate-shaped bent edge that is provided by bending an edge defining the opening of the insertion portion such that the edge is projected toward the seat pad. In the above-described configuration, the end portion of the slide fastener can be further stably locked to the projection having a relatively simple configuration. That is, the end portion of the slide fastener can be further stably disposed on the reverse side of the seat cover with the use of the relatively simple configuration.

In the above-described aspect, the end portion of the closed slide fastener may be inserted in and locked to the insertion portion in a state where a tension is applied to the end portion of the closed slide fastener in an extending direction of the end portion. In the above-described configuration, the end portion of the slide fastener is locked to the insertion portion in a state where an appropriate tension is applied to the end portion of the slide fastener and thus the end portion is hardly loose. Thus, the end portion of the slide fastener can be further stably locked to the insertion portion. That is, the end portion of the slide fastener can be further stably disposed on the reverse side of the seat cover.

In the above-described aspect, the end portion of the closed slide fastener may be projected from the edge end of the seat cover toward a seat inner side in a plane direction of the backboard. In the above-described configuration, the end portion of the slide fastener is directed toward the seat inner side. Thus, as compared to a case where the end portion of the slide fastener is projected toward a seat outer side, the end portion of the slide fastener can be smoothly disposed on the reverse side of the seat cover and can be smoothly inserted in the insertion portion. That is, the end portion of the slide fastener can be further smoothly disposed on the reverse side of the seat cover.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 4:
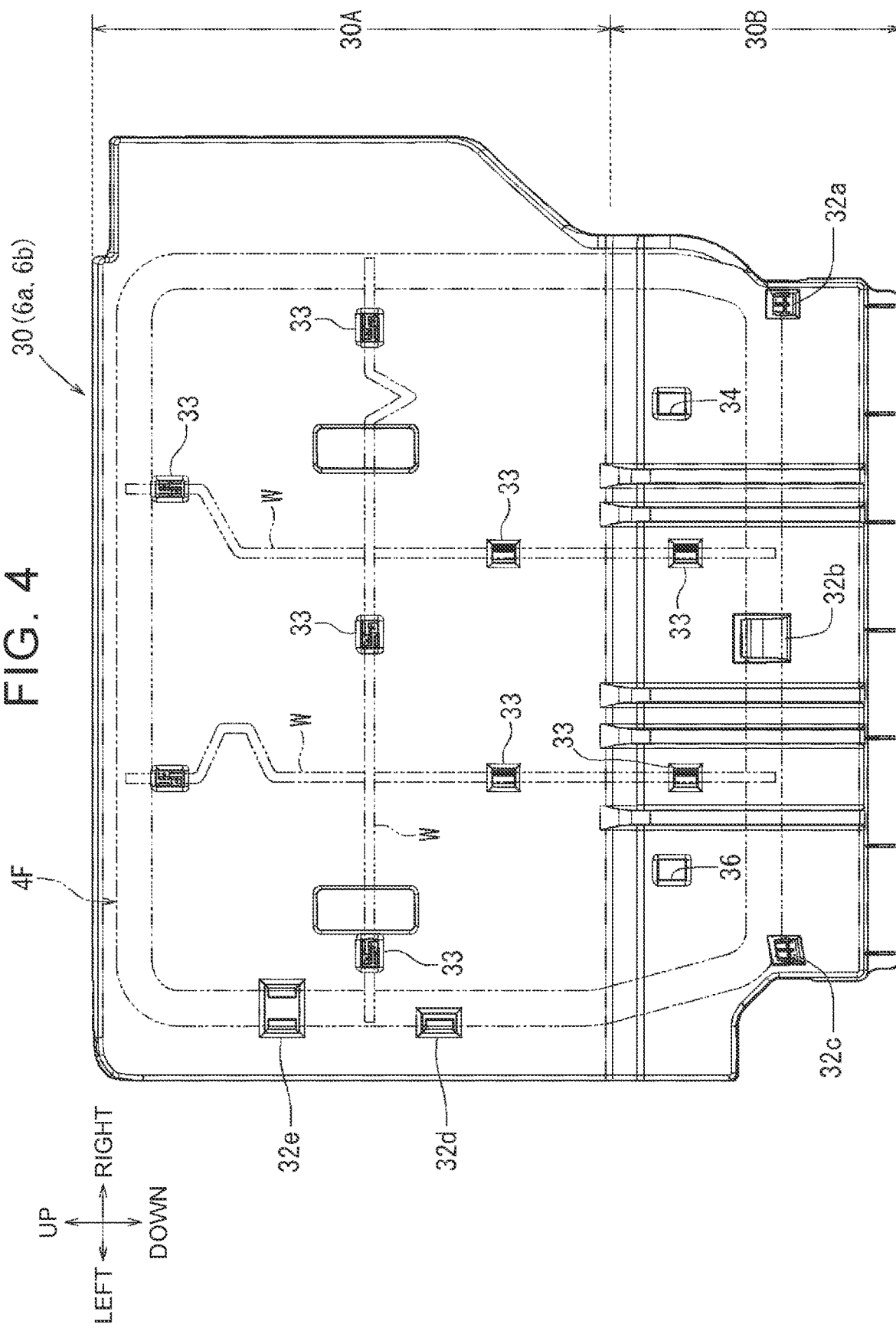
FIG. 4 is a view of an outer surface of a backboard.
Figure 5:
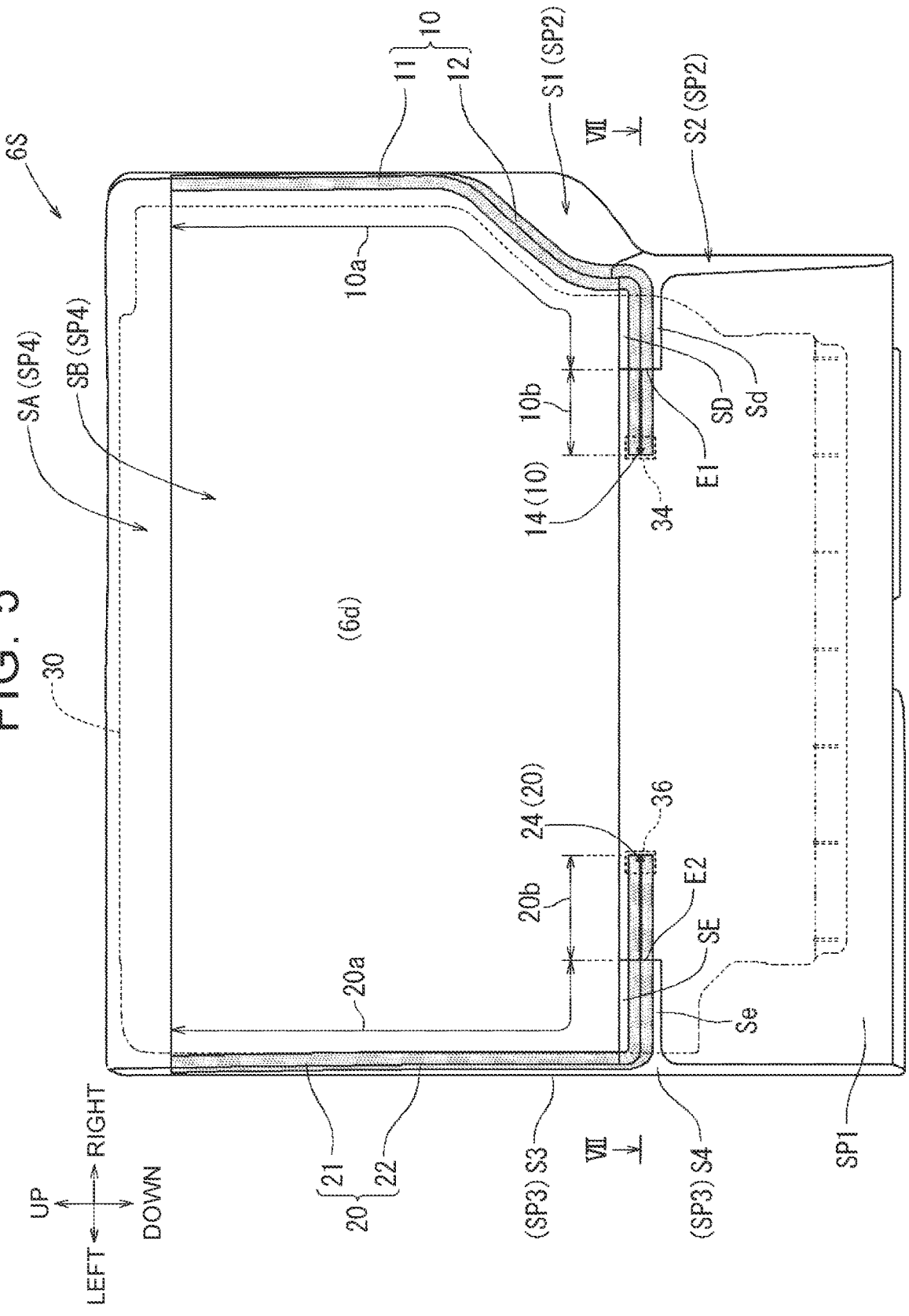
FIG. 5 is a rear view of a part of a seat cover.
Figure 6:
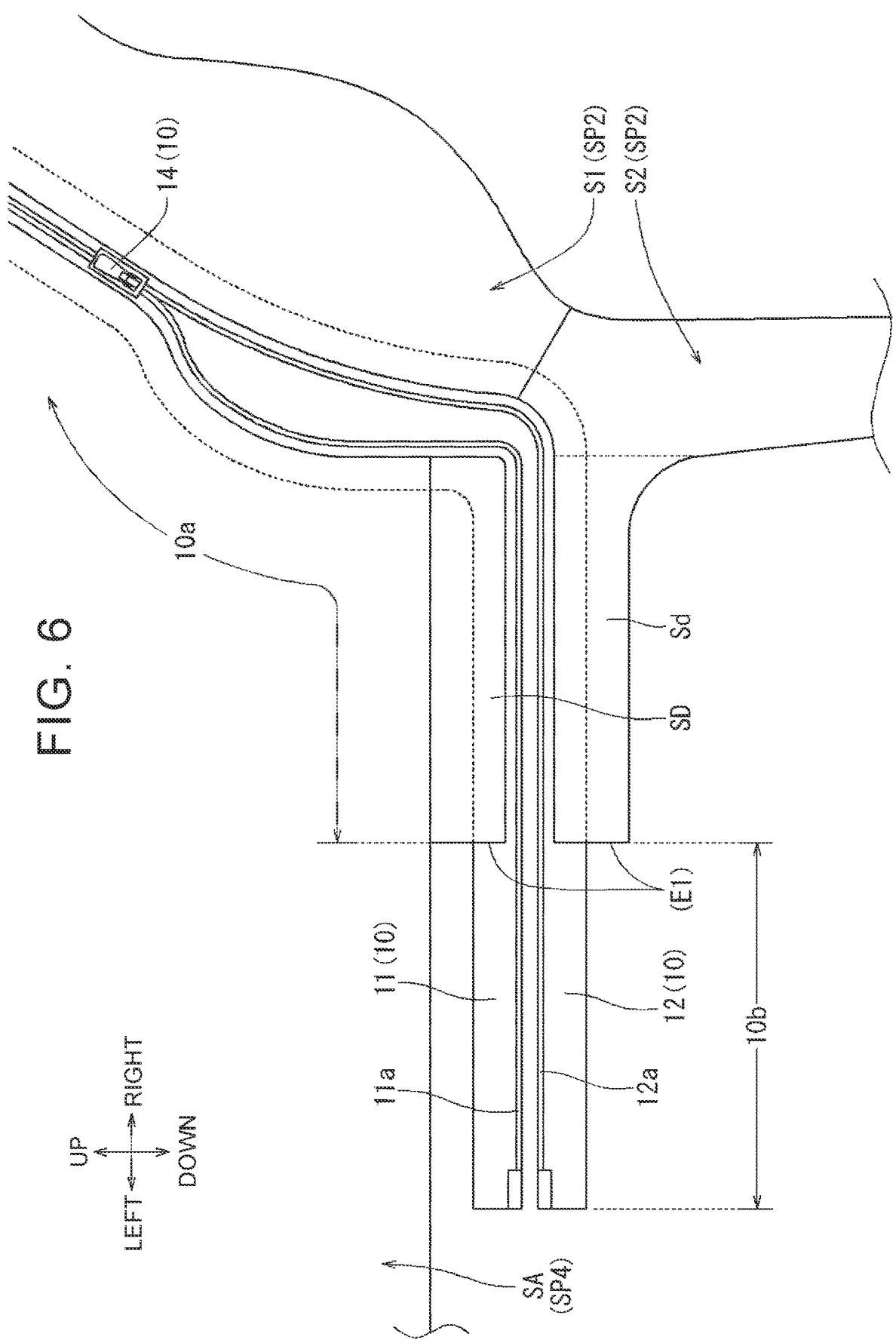
FIG. 6 is an enlarged view of a part of the seat cover.
Figure 7:
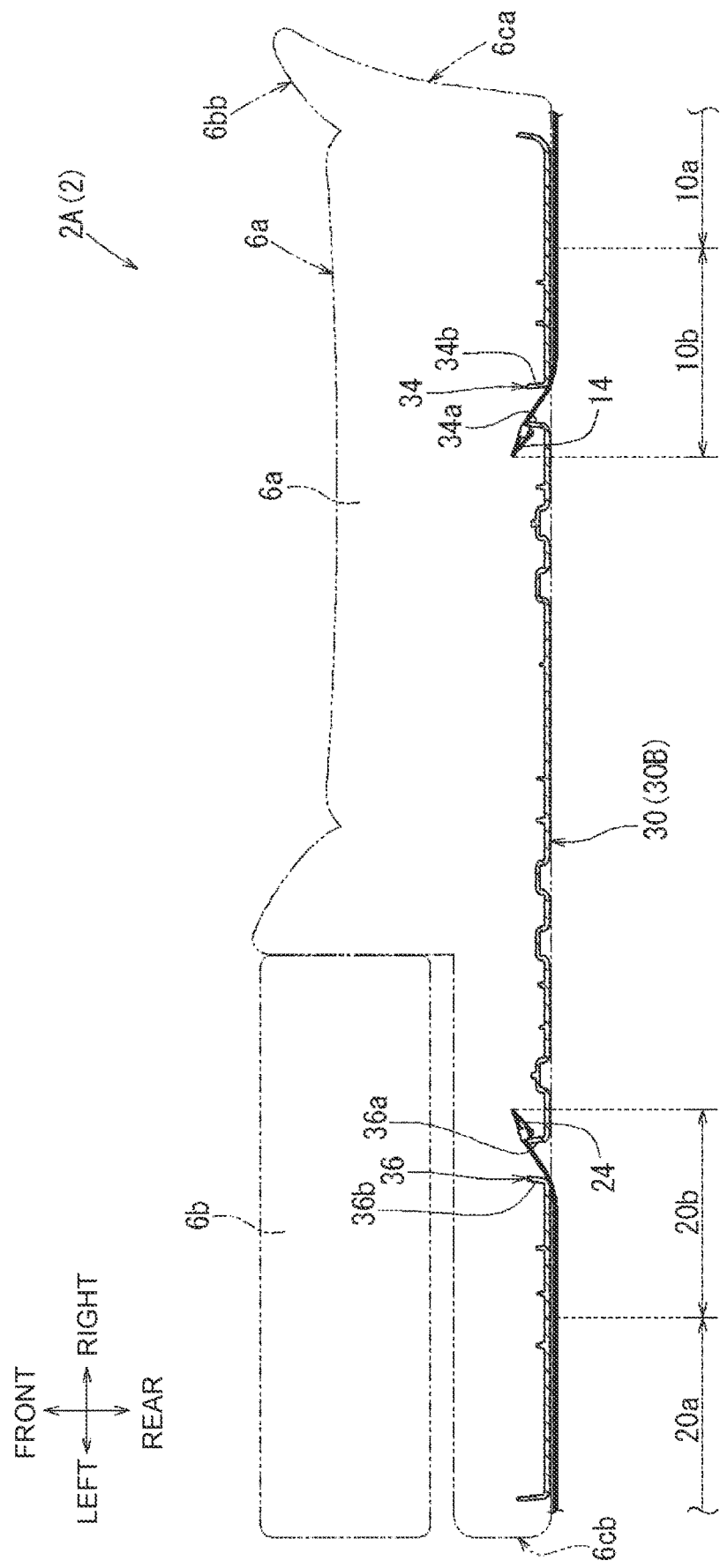
FIG. 7 is a sectional view of the seat back and corresponds to a section taken along line VII-VII in FIG. 5.

Hereinafter, an embodiment of the disclosure will be described with reference to FIG. 1 to FIG. 8. In each of the drawings, arrows that indicate a front-rear direction, an up-down direction, and a right-left direction of a vehicle seat are appropriately shown. In FIG. 5 and FIG. 6, for the sake of convenience, a covering piece in a lower portion of a rear surface of a seat back is not shown, and an end portion of a slide fastener (may be referred to as a "zip fastener") is shown in an exposed state. In FIG. 7, for the sake of convenience, a seat cover is not shown.

Figure 1:
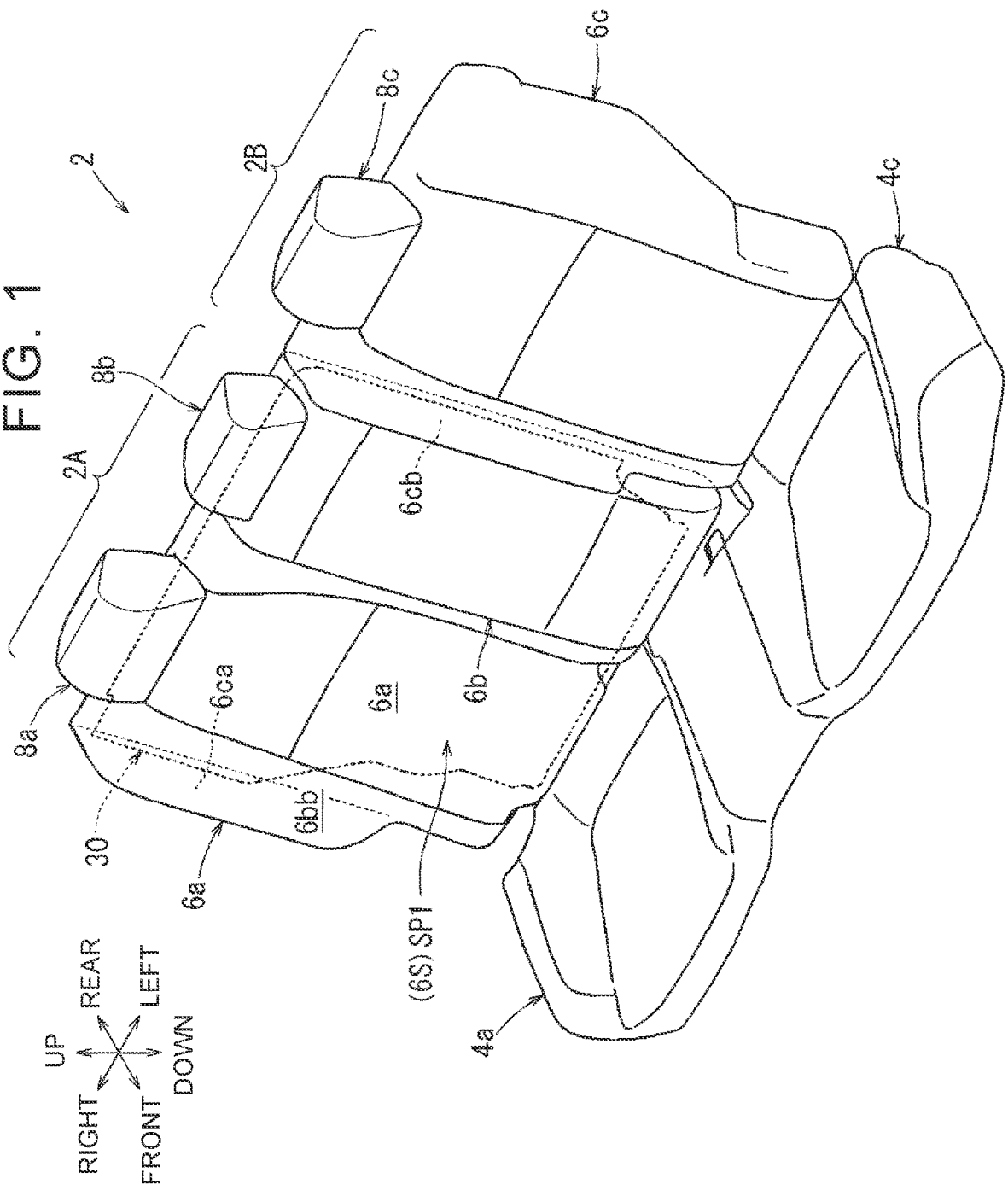
FIG. 1 is a perspective view of a vehicle seat.

A vehicle seat 2 in FIG. 1 is a bench seat on which a plurality of persons can be seated, and includes a right seat portion 2A and a left seat portion 2B. The right seat portion 2A is a wide portion that forms a seat right side. The right seat portion 2A includes a right seat cushion 4a, a right seat back 6a, an armrest 6b, a right headrest 8a, and a central headrest 8b. In the right seat portion 2A, a lower portion of the right seat back 6a is coupled to a rear portion of the right seat cushion 4a. The armrest 6b is disposed so as to be tiltable with respect to the right seat cushion 4a. When the armrest 6b is raised, the armrest 6b functions as a backrest similarly to the right seat back 6a. When the armrest 6b is laid down forward, the armrest 6b functions as an armrest. Headrests 8a, 8b corresponding to the right seat back 6a and the armrest 6b are disposed on upper sides of the right seat back 6a and the armrest 6b. The left seat portion 2B is a narrow portion that forms a seat left side. The left seat portion 2B includes a left seat cushion 4c, a left seat back 6c, and a left headrest 8c. Also, in the left seat portion 2B, a lower portion of the left seat back 6c is coupled to a rear portion of the left seat cushion 4c, and the left headrest 8c is disposed on an upper side of the left seat back 6c.

In the right seat portion 2A, the right seat back 6a and the armrest 6b have common basic configurations. More specifically, with reference to FIG. 2 and FIG. 3, the right seat back 6a and the armrest 6b have, as the common basic configurations, a seat frame 6F, a seat pad 6P, a seat cover 6S, a pair of slide fasteners 10, 20, and a backboard 30 (the basic configurations will be described in detail below). As will be described below, when the seat pad 6P is covered with the seat cover 6S, each of the slide fasteners 10, 20 on a seat rear surface are closed such that the seat cover 6S has a bag shape. Furthermore, end portions 10b, 20b of the slide fasteners 10, 20 are disposed on a reverse side of the seat cover 6S in consideration of seat appearance. In this configuration, the presence of the end portions 10b, 20b of the slide fasteners 10, 20 (particularly, sliders 14, 24 described below) is felt through the seat cover 6S. This may cause a feeling of a foreign body. Thus, in the embodiment, the end portions 10b, 20b of the slide fasteners 10, 20 are disposed on the reverse side of the seat cover 6S in a configuration described below, so as to reduce a feeling of a foreign body as much as possible. Hereinafter, each of the configurations will be described in detail.

Figure 3:
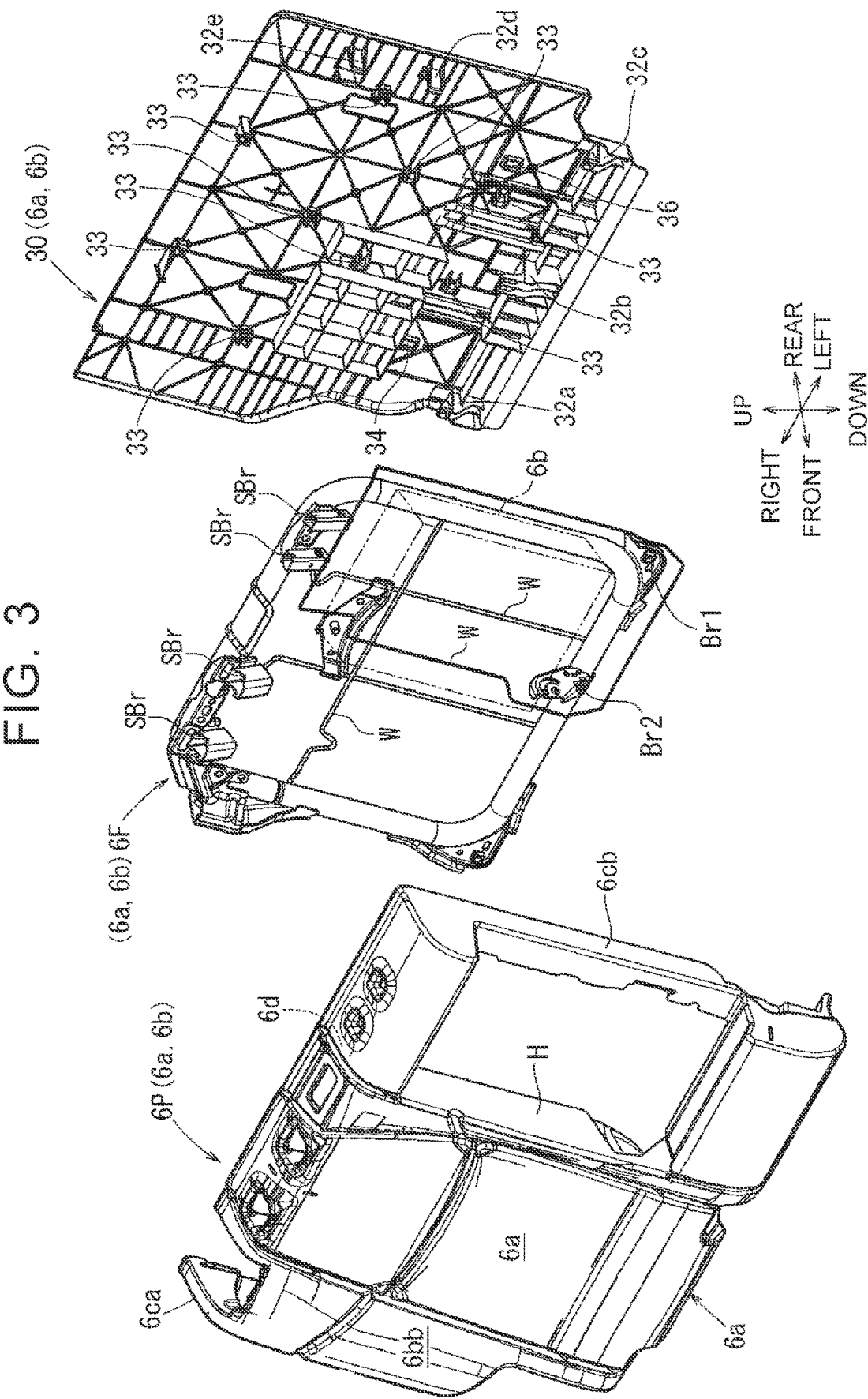
FIG. 3 is an exploded perspective view of a part of a seat back.

With reference to FIG. 3, the seat pad 6P is a substantially rectangular member in a front view and defines a seat outer shape. The seat pad 6P can be formed of a foamed resin such as polyurethane foam (density: 10 kg/m$^3$ to 60 kg/m$^3$). The seat pad 6P includes a front surface portion (6a, 6b); a right fringe portion 6ca and a left fringe portion 6cb, each of which serves as a lateral surface in a seat width direction; and a back surface portion 6d. A right portion of the front surface portion can be divided into a portion that forms the right seat back 6a and a bolster portion 6bb that is disposed on the right side of the right seat back 6a, the bolster portion 6bb projecting toward a seating side. A hole H that extends through the seat pad 6P in a thickness direction is provided in a left portion of the front surface portion. The armrest 6b attached to the seat frame 6F described below is inserted in and fitted to the hole H. The back surface portion 6d is a surface on a side opposite to the front surface portion (6a, 6b), and right and left edges of the back surface portion 6d are continuous with the fringe portions 6ca, 6cb.

With reference to FIG. 3, the seat frame 6F is a substantially rectangular frame body in the front view and defines a seat framework. The seat frame 6F can be formed with the use of a material having superior rigidity such as metal or a hard resin. The seat frame 6F includes a plurality of wire members W, a plurality of support brackets SBr, and a pair of left and right bracket portions Br1, Br2 (in FIG. 3, each of the wire members is denoted by the common symbol W, and each of the support brackets is denoted by the same reference symbol SBr, for the sake of convenience). The plurality of wire members W extend in the up-down direction and in the right-left direction within the seat frame 6F, and ends of the wire members W are fixed to a rear surface of the seat frame 6F. The plurality of support brackets SBr are tubular members that are used to attach the corresponding headrests 8a, 8b in FIG. 1, and are fixed at appropriate positions in an upper portion of the seat frame 6F. The left and right bracket portions Br1, Br2 are members to which the armrest 6b is coupled such that the armrest 6b is tiltable (in FIG. 3, the armrest 6b is shown by an alternate long and two short dashes line for the sake of convenience). The left bracket portion Br1 and the right bracket portion Br2 are fixed to a lower left portion of the seat frame 6F with an appropriate clearance being provided therebetween in the right-left direction. The left bracket portion Br1 and the right bracket portion Br2 hold the armrest 6b such that the armrest 6b is tiltable in a state where a lower portion of the armrest 6b is attached to the left bracket portion Br1 and the right bracket portion Br2.

Figure 2:
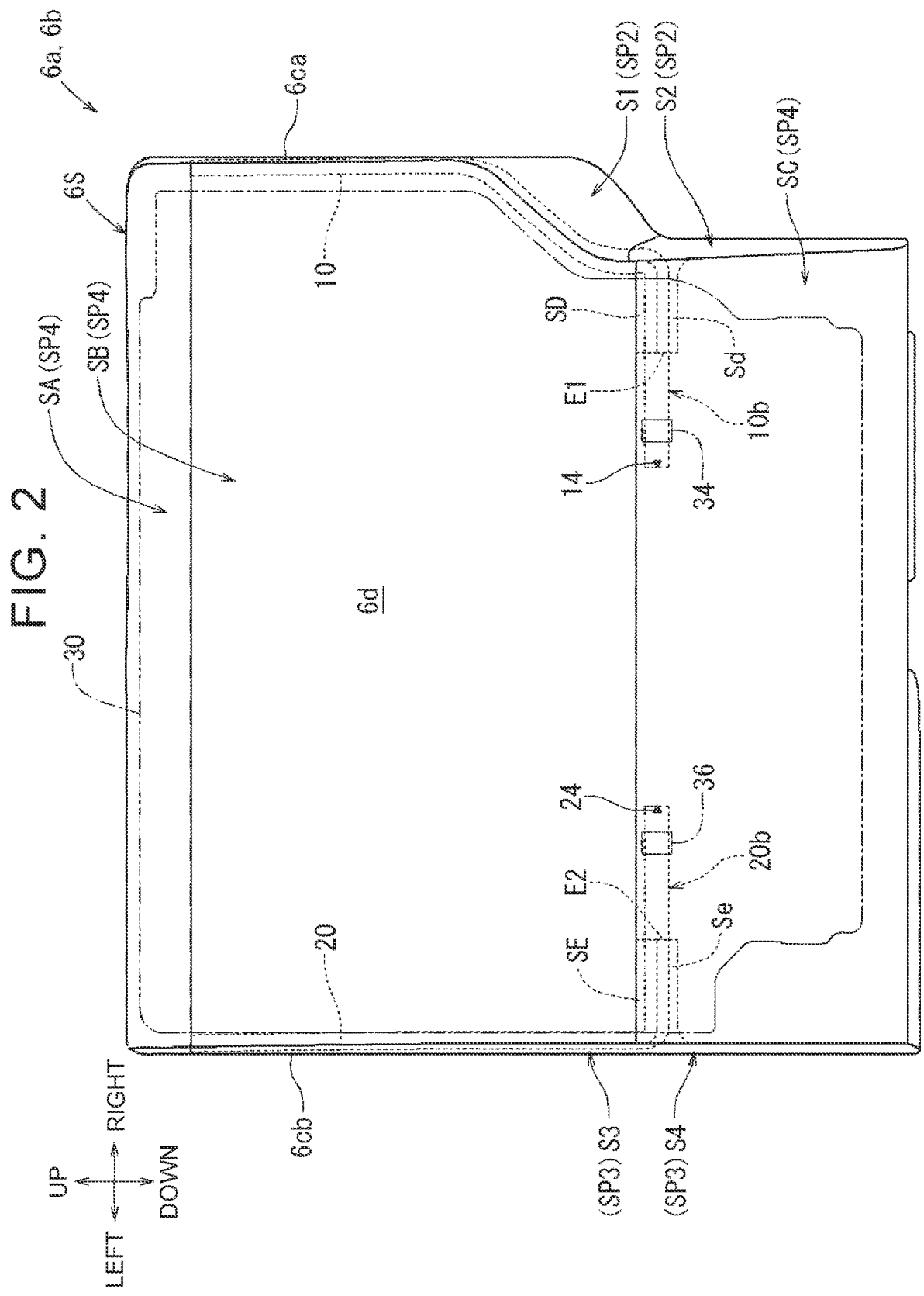
FIG. 2 is a rear view of a part of the vehicle seat.

The seat cover 6S is a surface material that forms a seat design surface. With reference to FIG. 1 and FIG. 2, the seat cover 6S includes a plurality of covering pieces SP1 to SP4; and seat cover edge ends (E1, E2) and the slide fasteners 10, 20 described below. The seat cover 6S has the bag shape that is opened downward. As shown in FIG. 3, the seat cover 6S can cover the seat pad 6P, the seat frame 6F, and the backboard 30 described below. Although a material of the seat cover 6S is not particularly limited, material examples of the seat cover 6S include fabrics (a woven material, a knitted material, and a nonwoven fabric) that is made of natural fibers or synthetic fibers and leather (natural leather and synthetic leather). As the plurality of covering pieces, the seat cover 6S includes a front covering piece SP1, a right covering piece SP2, a left covering piece SP3, and a rear covering piece SP4. The front covering piece SP1 shown in FIG. 1 is a covering piece that is disposed on a seat front surface and covers a large portion (a portion other than the hole H) of the front surface portion of the seat pad 6P.

The right covering piece SP2 shown in FIG. 2 is a covering piece that covers the right fringe portion 6ca. The right covering piece SP2 is formed by sewing an upper right covering piece S1 and a lower right covering piece S2 arranged in the stated order in the up-down direction. The left covering piece SP3 is a covering piece that covers the left fringe portion 6cb. The left covering piece SP3 is formed by sewing an upper left covering piece S3 and a lower left covering piece S4 arranged in the stated order in the up-down direction. In the right covering piece SP2, a lower right edge piece Sd protruding leftward is provided at an upper end of the lower right covering piece S2. Also, in the left covering piece SP3, a lower left edge piece Se protruding rightward is provided at an upper end of the lower left covering piece S4. Each of the lower edge pieces Sd, Se is an element forming a corresponding one of the seat cover edge ends (E1, E2) described below.

The rear covering piece SP4 shown in FIG. 2 is a covering piece that is disposed on a seat rear surface and covers an outer surface of the backboard 30 described below. The rear covering piece SP4 as a whole has a rectangular shape that is long in the right-left direction. The rear covering piece SP4 is formed by sewing an upper covering piece SA, and an intermediate covering piece SB, and a lower covering piece SC arranged in the stated order in the up-down direction. The upper covering piece SA covers a portion from a seat upper surface to an upper side of the seat rear surface, and a lower edge of the upper covering piece SA is sewn to an upper edge of the intermediate covering piece SB. The intermediate covering piece SB is long in the up-down direction and in the right-left direction. The intermediate covering piece SB covers a large portion of the seat rear surface. A pair of upper edge pieces (an upper right edge piece SD and an upper left edge piece SE) is attached to a lower end of the intermediate covering piece SB. The upper right edge piece SD and the upper left edge piece SE are separated from each other in the right-left direction. Each of the upper edge pieces SD, SE is a band-shaped portion extending in the right-left direction. Each of the upper edge pieces SD, SE is an element forming a corresponding one of the seat cover edge ends (E1, E2) as will be described below. With reference to FIG. 2, an upper edge of the lower covering piece SC is sewn to a lower edge of the intermediate covering piece SB. The lower covering piece SC covers a lower portion of the seat rear surface, and also covers the portions (i.e., the upper edge pieces SD, SE and the lower edge pieces Sd, Se) that form the seat cover edge ends described below.

With reference to FIG. 2 and FIG. 5, the seat cover 6S is provided with the seat cover edge ends (the right edge end E1 and the left edge end E2). The end portions 10b, 20b (described below) of the slide fasteners 10, 20 are projected from the seat cover edge ends. That is, in the embodiment, the upper right edge piece SD and the lower right edge piece Sd are provided on the right side of the seat rear surface. The upper right edge piece SD is provided in the rear covering piece SP4 (i.e., the lower edge of the intermediate covering piece SB). The lower right edge piece Sd is provided in the right covering piece SP2 (i.e., the upper end of the lower right covering piece S2). The upper right edge piece SD and the lower right edge piece Sd have substantially the same length in the right-left direction, and are disposed at positions where left edges thereof match each other. The left edges correspond to the seat cover edge end (the right edge end E1) in the disclosure. The upper left edge piece SE and the lower left edge piece Se are provided on the left side of the seat rear surface. The upper left edge piece SE is provided in the rear covering piece SP4 (i.e., the lower edge of the intermediate covering piece SB). The lower left edge piece Se is provided in the left covering piece SP3 (i.e., the upper end of the lower left covering piece S4). The upper left edge piece SE and the lower left edge piece Se have substantially the same length in the right-left direction, and are disposed at positions where right edges thereof match each other. The right edges correspond to the seat cover edge end (the left edge end E2) in the disclosure.

With reference to FIG. 2 and FIG. 5, each of the slide fasteners (the right slide fastener 10, the left slide fastener 20) is a member that connects the covering pieces that are adjacent to each other on the backboard 30-side. The backboard 30-side signifies a seat rear side (i.e., a rear side of the vehicle seat 2). The right slide fastener 10 is a member that connects the right covering piece SP2 and the rear covering piece SP4, and the left slide fastener 20 is a member that connects the left covering piece SP3 and the rear covering piece SP4. The right and left slide fasteners 10, 20 have substantially the same basic configuration. Accordingly, the basic configuration will be described in detail by using the right slide fastener 10 as an example.

With reference to FIG. 5 and FIG. 6, the right slide fastener 10 includes a pair of fastener pieces (a central fastener piece 11 and a lateral fastener piece 12) and the slider 14. The right slide fastener 10 can be divided into an attachment portion 10a and the end portion 10b. Each of the fastener pieces 11, 12 is a band member that is attached along an edge of the corresponding covering piece and has flexibility. Each of the fastener pieces 11, 12 includes an element portion including a plurality of teeth. The right slide fastener 10 extends in a reverse L shape when seen from the seat rear surface. The right slide fastener 10 extends linearly in the up-down direction, and a lower portion thereof is bent leftward. The central fastener piece 11 is sewn and attached to a portion of the rear covering piece SP4 from a right edge of the intermediate covering piece SB to a lower edge of the upper right edge piece SD. An outer edge of the central fastener piece 11 protrudes outward from the portion of the corresponding covering piece. With reference to FIG. 6, the central fastener piece 11 is provided with a central element portion 11a in which the plurality of teeth are disposed in parallel. The teeth of the central element portion 11a are disposed in parallel at appropriate intervals in an extending direction of the central fastener piece 11. The lateral fastener piece 12 is sewn and attached to a portion of the right covering piece SP2 from a left edge of the upper right covering piece S1 to an upper edge of the lower right edge piece Sd of the lower right covering piece S2. An outer edge of the lateral fastener piece 12 protrudes outward from the portion of the corresponding covering piece and is provided with a lateral element portion 12a in which the plurality of teeth are disposed in parallel. The teeth of the lateral element portion 12a can mesh with the corresponding teeth of the central element portion 11a and are disposed in parallel at appropriate intervals in an extending direction of the lateral fastener piece 12.

Figure 8:
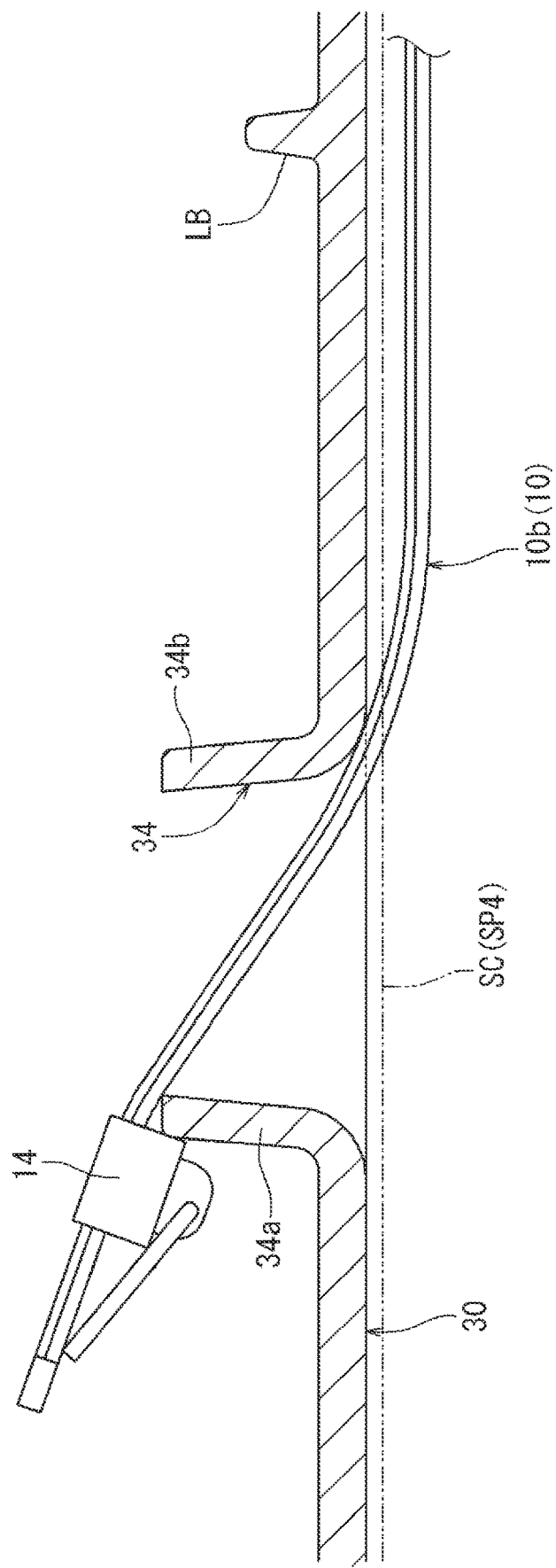
FIG. 8 is an enlarged sectional view of the seat back.

With reference to FIG. 6 to FIG. 8, the slider 14 is made of a metal plate, and includes a metal piece serving as a handle. The slider 14 can cause the teeth of the central element portion 11a and the teeth of the lateral element portion 12a to mesh with each other. That is, when the slider 14 is disposed at upper ends of the central element portion 11a and the lateral element portion 12a, both of the element portions do not mesh each other, and the central fastener piece 11 and the lateral fastener piece 12 can freely move relative to each other in the right-left direction. Then, when the slider 14 moves downward from the upper ends to cause the lateral element portion 12a and the central element portion 11a to mesh with each other, the central fastener piece 11 and the lateral fastener piece 12 are connected to each other.

With reference to FIG. 5 and FIG. 6, the right slide fastener 10 can be divided into the attachment portion 10a and the end portion 10b. The attachment portion 10a is a portion of the right slide fastener 10 that is attached to the corresponding covering piece. More specifically, in the attachment portion 10a, the central fastener piece 11 is sewn to the portion from the right edge of the intermediate covering piece SB to the lower edge of the upper right edge piece SD, and the lateral fastener piece 12 is sewn to the portion from the left edge of the upper right covering piece S1 to the upper edge of the lower right edge piece Sd. The end portion 10b of the right slide fastener 10 is a portion of the right slide fastener 10 that is projected leftward toward a seat inner side from left edges of the upper right edge piece SD and the lower right edge piece Sd (i.e., from the right edge end E1). The end portion 10b of the right slide fastener 10 is not attached to any corresponding covering piece and is disposed in a free state. The end portion 10b of the right slide fastener 10 can be projected leftward from the right edge end E1 in a substantially horizontal state by pulling the end portion 10b leftward.

With reference to FIG. 5, similarly, the left slide fastener 20 includes a pair of fastener pieces (a central fastener piece 21 and a lateral fastener piece 22) and the slider 24. The left slide fastener 20 can be divided into an attachment portion 20a and the end portion 20b. The fastener pieces 21, 22 and the slider 24 have substantially the same basic configurations as those of the corresponding members of the right slide fastener 10. The left slide fastener 20 extends in an L shape when seen from the seat rear surface. The left slide fastener 20 extends linearly in the up-down direction, and a lower portion thereof is bent rightward. In the attachment portion 20a of the left slide fastener 20, the central fastener piece 21 is sewn to a portion from a left edge of the intermediate covering piece SB to a lower edge of the upper left edge piece SE, and the lateral fastener piece 22 is sewn to a portion from a right edge of the upper left covering piece S3 to an upper edge of the lower left edge piece Se. The end portion 20b of the left slide fastener 20 is a portion of the left slide fastener 20 that is projected rightward toward the seat inner side from right edges of the upper left edge piece SE and the lower left edge piece Se (i.e., from the left edge end E2).

With reference to FIG. 3, the backboard 30 is a plate-shaped member that is disposed behind the back surface portion 6d of the seat pad 6P and the seat frame 6F. The backboard 30 has a rectangular shape that is long in the right-left direction in the front view, and is slightly larger than outer edges of the seat frame 6F. Although a material of the backboard 30 is not particularly limited, the backboard 30 can be typically formed with the use of a material having superior rigidity such as a resin or metal. With reference to FIG. 4, the backboard 30 can be divided into an upper portion 30A that forms an upper side of the backboard 30 and a lower portion 30B that forms a lower side of the backboard 30. The upper portion 30A is relatively wide in the right-left direction, and is covered with the intermediate covering piece SB of the rear covering piece SP4 shown in FIG. 2 and FIG. 5. The lower portion 30B is relatively narrow, and is covered with the lower covering piece SC of the rear covering piece SP4 shown in FIG. 2. Note that, while left edges of the upper portion 30A and the lower portion 30B extend substantially linearly in the up-down direction, a lower portion of a right edge of the upper portion 30A is curved leftward such that the width of the upper portion 30A in the right-left direction is reduced, and the lower portion of the right edge of the upper portion 30A is connected to a right edge of the lower portion 30B.

In addition, with reference to FIG. 2 and FIG. 4, the backboard 30 includes a plurality of first locking portions 32a to 32e, a plurality of second locking portions 33, and a pair of right and left insertion portions 34, 36 described below (in FIG. 2 and FIG. 4, each of the second locking portions is denoted by the common reference numeral 33 for the sake of convenience). Each of the plurality of first locking portions 32a to 32e is locked to a frame portion of the seat frame 6F. Each of the plurality of first locking portions 32a to 32e is a plate-shaped portion that is projected forward. On a reverse surface of the backboard 30 that faces the seat pad 6P, the plurality of first locking portions 32a to 32e are disposed at appropriate intervals along a portion from a lower edge to a left edge thereof. Each of the second locking portions 33 holds the corresponding wire member W, and includes a pair of plate-shaped portions projected forward. On a reverse side of the backboard 30, the plurality of second locking portions 33 are disposed at appropriate intervals along positions at which the corresponding wire members W are arranged. Note that, on the reverse surface of the backboard 30 that faces the seat pad 6P, linear ribs LB shown in FIG. 8 are provided to be projected and to extend in the up-down direction and the right-left direction, in order to secure the rigidity.

With reference to FIG. 4, FIG. 5, and FIG. 7, the end portions 10b, 20b of the slide fasteners 10, 20 are inserted through, and are locked to the right insertion portion 34 and the left insertion portion 36. The right insertion portion 34 is provided at a right side in the lower portion 30B of the backboard 30, and is disposed at a position where the end portion 10b of the right slide fastener 10 can be inserted in the right insertion portion 34. The left insertion portion 36 is provided at a left side in the lower portion 30B of the backboard 30, and is disposed at a position where the end portion 20b of the left slide fastener 20 can be inserted in the left insertion portion 36. The right and left insertion portions 34, 36 have substantially the same basic configuration except that the right and left insertion portions 34, 36 are disposed so as to be substantially bilaterally symmetrical. Accordingly, the basic configuration will be described in detail by using the right insertion portion 34 as an example.

With reference to FIG. 4 and FIG. 7, the right insertion portion 34 is a substantially rectangular hole in the front view that extends through the backboard 30 in the thickness direction. An opening of the right insertion portion 34 has a size that allows the end portion 10b and the slider 14 of the right slide fastener 10 to be inserted in the right insertion portion 34. With reference to FIG. 7 and FIG. 8, projections (34a, 34b) are provided at a peripheral edge defining the right insertion portion 34 so as to surround the opening. The projections (34a, 34b) are bent edges that are formed by bending forward the peripheral edge (an upper edge, a lower edge, and right and left edges) surrounding (defining) the opening of the right insertion portion 34 such that the peripheral edge is projected from the reverse surface toward the seat pad 6P. In the right insertion portion 34, the inner projection 34a that is the bent left edge, and the outer projection 34b that is the bent right edge are disposed such that the inner projection 34a and the outer projection 34b are separated from each other in the right-left direction and face each other. Each of the inner projection 34a and outer projection 34b is raised at approximately 90° from the reverse surface of the backboard 30. In addition, although not shown, in the right insertion portion 34, an upper projection that is the bent upper edge, and a lower projection that is the bent lower edge are disposed such that the upper projection and the lower projection are separated from each other in the up-down direction and face each other.

The right insertion portion 34 may be disposed at any position as long as the end portion 10b of the right slide fastener 10 can be inserted in the right insertion portion 34. In the embodiment, the right insertion portion 34 is disposed on the left side of the right edge end E1 of the seat cover 6S with an appropriate clearance being provided between the right insertion portion 34 and the right edge end E1. That is, as shown in FIG. 2 and FIG. 5, the state where the end portion 10b of the right slide fastener 10 in the closed state is pulled leftward (in a plane direction of the backboard 30) is set as a reference state. The right insertion portion 34 is disposed at a position where the slider 14 at the end portion 10b of the right slide fastener 10 is disposed in the reference state. Since the right insertion portion 34 is disposed at this position, the end portion 10b of the right slide fastener 10 is inserted in the right insertion portion 34 in a state where a tension is applied to the end portion 10b in an extending direction of the end portion 10b as shown in FIG. 7 and FIG. 8. In this state, the slider 14 is locked to the inner projection 34a of the right insertion portion 34.

Similarly, with reference to FIG. 4 and FIG. 7, the left insertion portion 36 is a substantially rectangular hole in the front view that extends through the backboard 30 in the thickness direction. An opening of the left insertion portion 36 has a size that allows the end portion 20b and the slider 24 of the left slide fastener 20 to be inserted in the left insertion portion 36. In addition, as shown in FIG. 7, in a peripheral edge defining the left insertion portion 36, an inner projection 36a that is a bent right edge, and an outer projection 36b that is a bent left edge are disposed such that the inner projection 36a and the outer projection 36b are separated from each other in the right-left direction and face each other. The state where the end portion 20b of the left slide fastener 20 in the closed state is pulled rightward (in the plane direction of the backboard 30) is set as a reference state. The left insertion portion 36 is disposed at a position where the slider 24 at the end portion 20b of the left slide fastener 20 is disposed in the reference state. Since the left insertion portion 36 is disposed at the position, the end portion 20b of the left slide fastener 20 is inserted in the left insertion portion 36 in a state where a tension is applied to the end portion 20b in an extending direction of the end portion 20b. Furthermore, the slider 24 is locked to the inner projection 36a of the left insertion portion 36.

With reference to FIG. 3, the seat pad 6P and the backboard 30 are disposed on the seat frame 6F, and the seat cover 6S shown in FIG. 2 covers them from above. At this time, it is desirable that a space should be formed between the right covering piece SP2 and the rear covering piece SP4 (and a space should be formed between the left covering piece SP3 and the rear covering piece SP4) by opening the right and left slide fasteners 10, 20. For example, when a space is formed between the right covering piece SP2 and the rear covering piece SP4 by opening the right slide fastener 10 as shown in FIG. 6, the seat cover 6S can smoothly cover the seat pad 6P and so on. Next, as shown in FIG. 2, after the seat cover 6S covers the seat pad 6P and so on, the sliders 14, 24 are moved downward to close the slide fasteners 10, 20. Then, in consideration of the seat appearance, the end portions 10b, 20b of the slide fasteners 10, 20, which are projected from the seat cover edge ends (E1, E2), and the sliders 14, 24 are disposed on the reverse side of the lower covering piece SC of the seat cover 6S. In the configuration, it is desirable that each of the end portions 10b, 20b of the slide fasteners 10, 20 should be disposed on the reverse side of the seat cover 6S so as to reduce a feeling of a foreign body as much as possible.

In view of the above, the backboard 30 of the embodiment is provided with the insertion portion 34 (36). The end portion 10b (20b) of the slide fastener, which is disposed on the reverse side (i.e., the inner side) of the seat cover 6S, and the slider 14 (24) are inserted through the insertion portion 34 (36) toward the seat pad, and are locked to the insertion portion 34 (36). That is, with reference to FIG. 7, in the backboard 30, the right insertion portion 34 is disposed at the position where the end portion 10b of the right slide fastener 10 can be inserted in the right insertion portion 34, and the left insertion portion 36 is disposed at the position where the end portion 20b of the left slide fastener 20 can be inserted in the left insertion portion 36. Accordingly, the end portion 10b of the right slide fastener 10 is projected leftward from the attachment portion 10a in the substantially horizontal state by pulling the end portion 10b of the right slide fastener 10 leftward, that is, toward the seat inner side. Thus, the end portion 10b of the right slide fastener 10 can be smoothly disposed on the reverse side (i.e., the inner side) of the lower covering piece SC. Then, the end portion 10b of the right slide fastener 10 and the slider 14 are inserted in the right insertion portion 34, and therefore, the backboard 30 is disposed between the seat cover 6S and the slider 14. Thus, it is possible to avoid as much as possible the situation where the presence of the slider 14 and so on is felt through the seat cover 6S. Therefore, it is possible to realize the configuration that reduces a feeling of a foreign body as much as possible. Furthermore, in the embodiment, as shown in FIG. 7 and FIG. 8, the end portion 10b of the right slide fastener 10 is inserted in the right insertion portion 34 in the state where a tension is applied to the end portion 10b in the right-left direction that is the extending direction of the end portion 10b, and thus the end portion 10b is not loose. In this state, the slider 14 is urged in a direction in which the slider 14 is locked to the inner projection 34a of the right insertion portion 34. As a result, the slider 14 is securely (i.e., reliably) locked to the inner projection 34a. Furthermore, the end portion 10b of the right slide fastener 10 is positioned in and locked to the right insertion portion 34 such that the end portion 10b is prevented from moving freely. Thus, it is possible to appropriately avoid the situation where abnormal noise is caused by contact of the end portion 10b of the right slide fastener 10 with the backboard 30.

Similarly, the end portion 20b of the left slide fastener 20 and the slider 24 are inserted in the left insertion portion 36. Thus, it is possible to realize the configuration that reduces a feeling of a foreign body as much as possible. Furthermore, as shown in FIG. 7, the end portion 20b of the left slide fastener 20 is inserted in the left insertion portion 36 in the state where the tension is applied to the end portion 20b in the extending direction of the end portion 20b, and thus, the slider 24 is securely (i.e., reliably) locked to the inner projection 36a of the left insertion portion 36. Moreover, in the embodiment, the end portion 20b of the left slide fastener 20 and the end portion 10b of the right slide fastener 10 are pulled toward the seat inner side. In other words, the end portion 20b of the left slide fastener 20 and the end portion 10b of the right slide fastener 10 are pulled in directions in which the end portion 20b and the end portion 10b approach each other. Thus, the seat cover 6S is brought into an appropriately tightened state in the right-left direction. Therefore, the seat cover 6S can cover the seat pad 6P and so on such that finished quality is good (i.e., a superior finished appearance is provided).

As it has been described so far, in the embodiment, the end portion 10b (20b) of the slide fastener and the slider 14 (24) are disposed on the reverse side of the seat cover 6S, and are inserted in and locked to the insertion portion 34 (36) of the backboard 30. Thus, the backboard 30 is disposed between the seat cover 6S and the end portion 10b (20b) (the slider) of the slide fastener. Thus, it is possible to avoid as much as possible the situation where the presence of the slider 14 (24) and so on is felt through the seat cover 6S. In addition, in the embodiment, the end portion 10b (20b) of the slide fastener can be stably locked to the projection 34a (36a) that is provided around the insertion portion 34 (36). In particular, the end portion 10b (20b) of the slide fastener can be stably locked to the projection 34a (36a) as the bent edge having the relatively simple configuration. Furthermore, in the embodiment, the end portion 10b (20b) of the slide fastener is locked to the insertion portion 34 (36) in the state where an appropriate tension is applied to the end portion 10b (20b) and thus the end portion 10b (20b) is hardly loose. Thus, the end portion 10b (20b) of the slide fastener can be further stably locked to the insertion portion 34 (36). Moreover, in the embodiment, the end portion 10b (20b) of the slide fastener is directed toward the seat inner side. Accordingly, as compared to a case where the end portion 10b (20b) of the slide fastener is projected toward a seat outer side, the end portion 10b (20b) of the slide fastener can be smoothly disposed on the reverse side of the seat cover 6S and can be inserted in the insertion portion 34 (36). Therefore, according to the embodiment, the end portion 10b (20b) of the slide fastener can be disposed on the reverse side of the seat cover 6S such that a feeling of a foreign body is reduced as much as possible.

The vehicle seat of the disclosure is not limited to the above-described embodiment and the disclosure can be implemented in any of various other embodiments. In the embodiment, the configuration (for example, the shape, the size, and the constituent elements such as the insertion portions) of the backboard 30 is exemplified. However, there is no intention to limit the configuration of the backboard. For example, the plurality of insertion portions or a single insertion portion may be provided at appropriate positions or an appropriate position on the backboard in accordance with the configuration (the number, the position, and the like) of the linear fastener of the seat cover. For example, with reference to FIG. 2, the right insertion portion 34 may be provided at a position where the end portion 10b of the right slide fastener 10 is disposed. For example, the right insertion portion 34 may be disposed on an arc that has a specified radius (i.e., a radius that corresponds to the length of the end portion) from the right edge end E1 as a center. In addition, a part or a whole of the end portion of the slide fastener may be inserted in the insertion portion. In addition to the case where the projection of the insertion portion is formed by using the bent edge, the projection of the insertion portion may be formed by using a projection (a thick portion, a rib, or the like of the backboard) that is formed around the insertion portion and is projected forward. Furthermore, after being inserted in the insertion portion, the end portion of the slide fastener can be locked to another member such as a clip. In this case, the other member serves as a part of the insertion portion. Moreover, the bent edge that forms the projection may be raised approximately at 90° from the reverse surface of the backboard or may be raised so as to be slightly tilted.

In the embodiment, the configuration (the shape, the size, each of the covering pieces, the edge ends, and so on) of the seat cover 6S is exemplified. However, there is no intention to limit the configuration of the seat cover. For example, the seat cover may be provided with the plurality of slide fasteners or a single slide fastener at appropriate positions or an appropriate position, and the end portion of the slide fastener may be projected in an appropriate direction from the edge end that is set at an appropriate position in the seat cover. For example, the end portion of the slide fastener may be projected downward from the lower edge of the seat cover, which serves as the edge end. In this case, the end portion of the slide fastener may be folded upward and then inserted in the insertion portion. In addition, the end portion of the slide fastener in a slightly loose state may be inserted in and locked to the insertion portion.

In the embodiment, the configuration (the shape, the size, the components, and so on) of the vehicle seat 2 is exemplified. However, there is no intention to limit the configuration of the vehicle seat. For example, the vehicle seat may be for a single occupant or a plurality of occupants. For example, the configuration of the disclosure may be applied to the left seat portion in the embodiment. In addition, in the embodiment, although the configuration of the disclosure is applied to the right seat back 6a and the armrest 6b, the configuration of the disclosure may be applied to only the seat back or the armrest. Furthermore, the configuration of the embodiment may be also applied to all kinds of vehicle seats such as seats for a vehicle, an airplane, and a train.

What is claimed is:

1. A vehicle seat comprising:
   a seat pad that defines a seat outer shape;
   a backboard having a plate shape, the backboard being disposed on a back side of the seat pad; and
   a seat cover that covers the seat pad and the backboard, wherein:
   the seat cover includes a pair of covering pieces adjacent to each other on the backboard-side, and a slide fastener that connects the pair of covering pieces;
   when the slide fastener is closed by sliding a slider in a longitudinal direction of the slide fastener, an end portion of the slide fastener in the longitudinal direction of the slide fastener extends from an edge end of the seat cover in a state where the slider is disposed in the end portion of the slide fastener;
   the backboard is provided with an insertion portion; and
   when the end portion of the closed slide fastener is disposed on a reverse side of the seat cover, the end portion of the slide fastener and the slider are inserted in and locked to the insertion portion.

2. The vehicle seat according to claim 1, wherein:
   the insertion portion includes a projection;
   when the end portion of the slide fastener is inserted in the insertion portion, the end portion is locked to the projection; and
   the projection is provided around an opening of the insertion portion and is projected toward the seat pad.

3. The vehicle seat according to claim 2, wherein the projection is a plate-shaped bent edge that is provided by bending an edge defining the opening of the insertion portion such that the edge is projected toward the seat pad.

4. The vehicle seat according to claim 2, wherein
   the slider includes an outwardly projected portion that projects from an outer surface of the end portion in a direction away from the seat pad when an inner surface of the end portion is positioned to extend along the seat pad, and
   the outwardly projected portion of the slider is inserted in the insertion portion and is locked to the projection.

5. The vehicle seat according to claim 1, wherein the end portion of the closed slide fastener is inserted in and locked to the insertion portion in a state where a tension is applied to the end portion of the closed slide fastener in an extending direction of the end portion.

6. The vehicle seat according to claim 1, wherein the end portion of the closed slide fastener is projected from the edge end of the seat cover toward a seat inner side in a plane direction of the backboard.

7. The vehicle seat according to claim 1, wherein
   the insertion portion comprises an opening including a first edge and a second edge that extend substantially perpendicular to an extending direction of the end portion,
   the second edge of the opening is positioned closer to the edge end of the seat cover than the first edge of the opening,
   the first edge includes a projection, and
   the end portion of the slide fastener is locked to the projection provided at the first edge.

8. The vehicle seat according to claim 7, wherein the first edge of the opening is positioned closer to the center in a plane of the backboard than the second edge of the opening.

9. The vehicle seat according to claim 1, wherein a length of the end portion of the slide fastener in an extending direction of the end portion from the edge end of the seat cover is greater than a width of the end portion.

10. The vehicle seat according to claim 1, wherein the end portion of the slide fastener extends from the edge end of the seat cover in a longitudinal direction of the slide fastener.

* * * * *